Patented Oct. 25, 1932

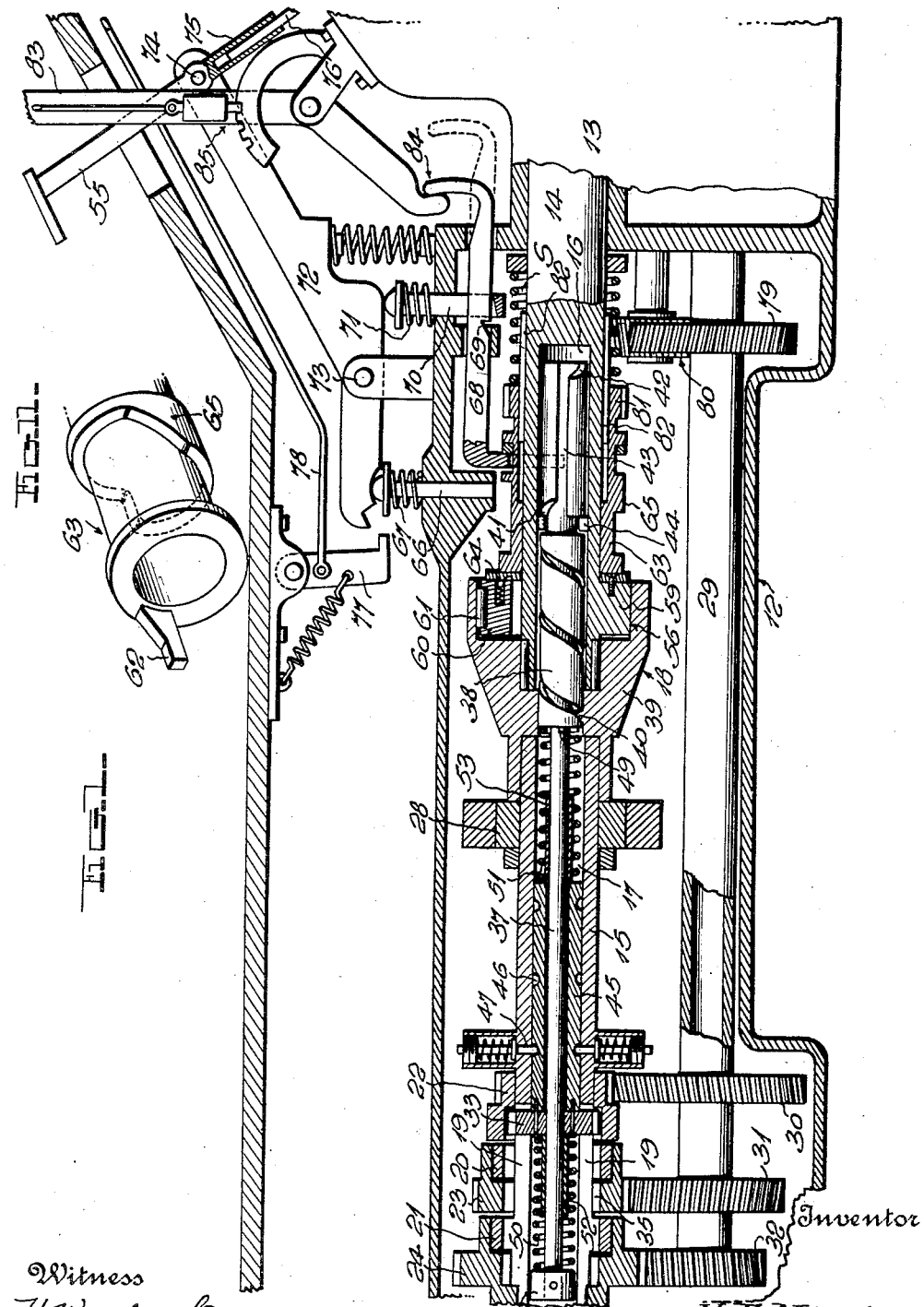

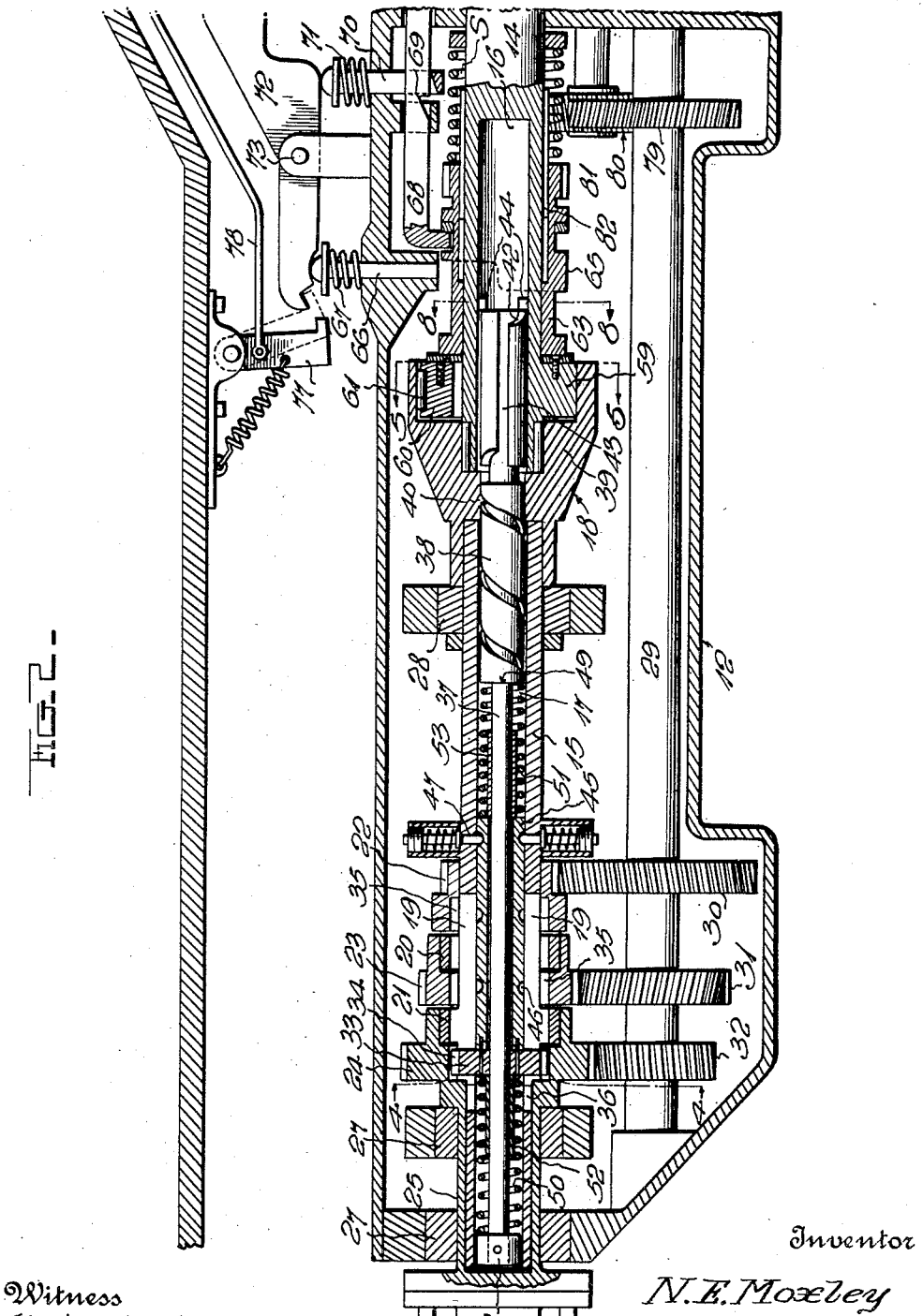

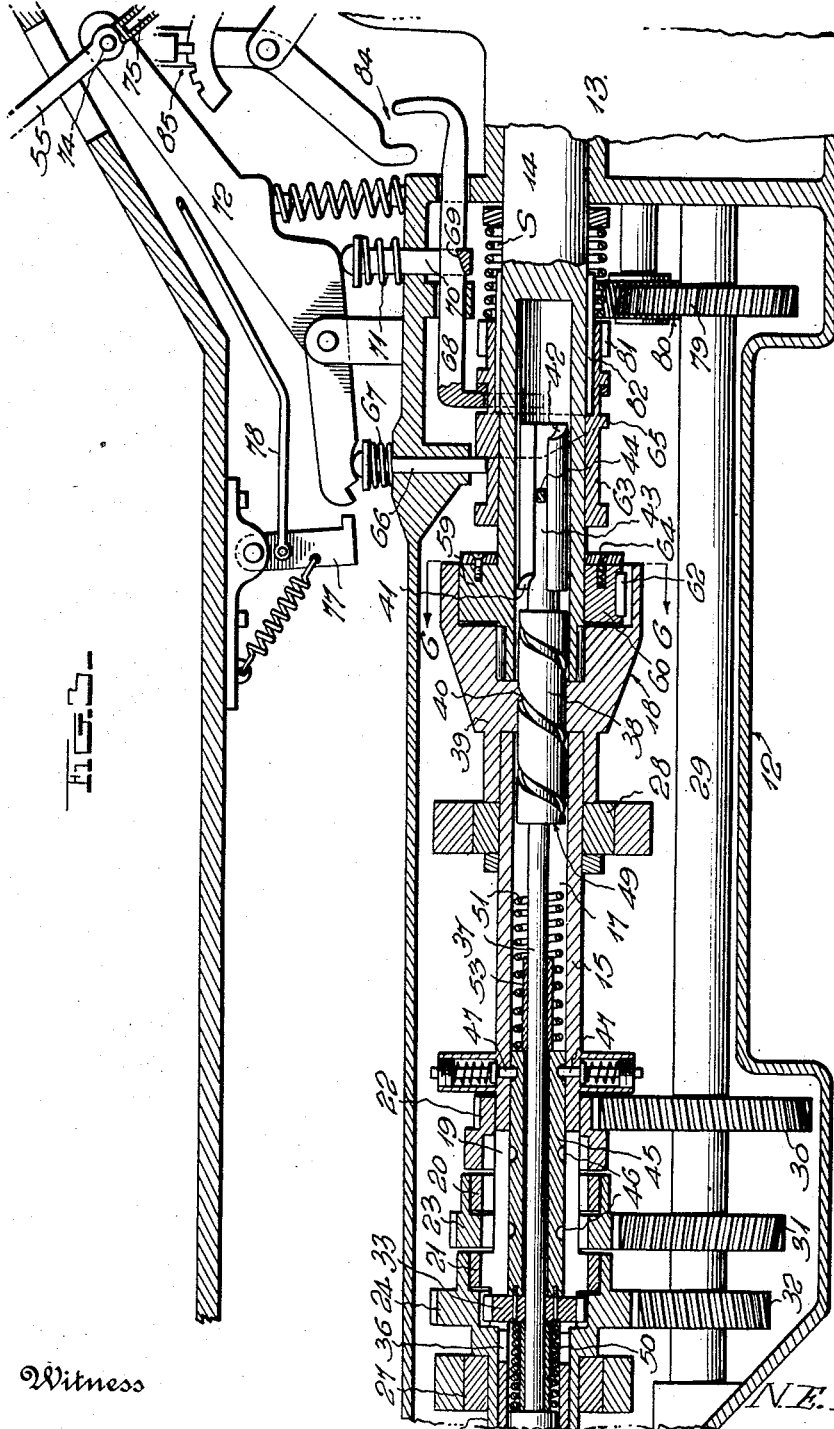

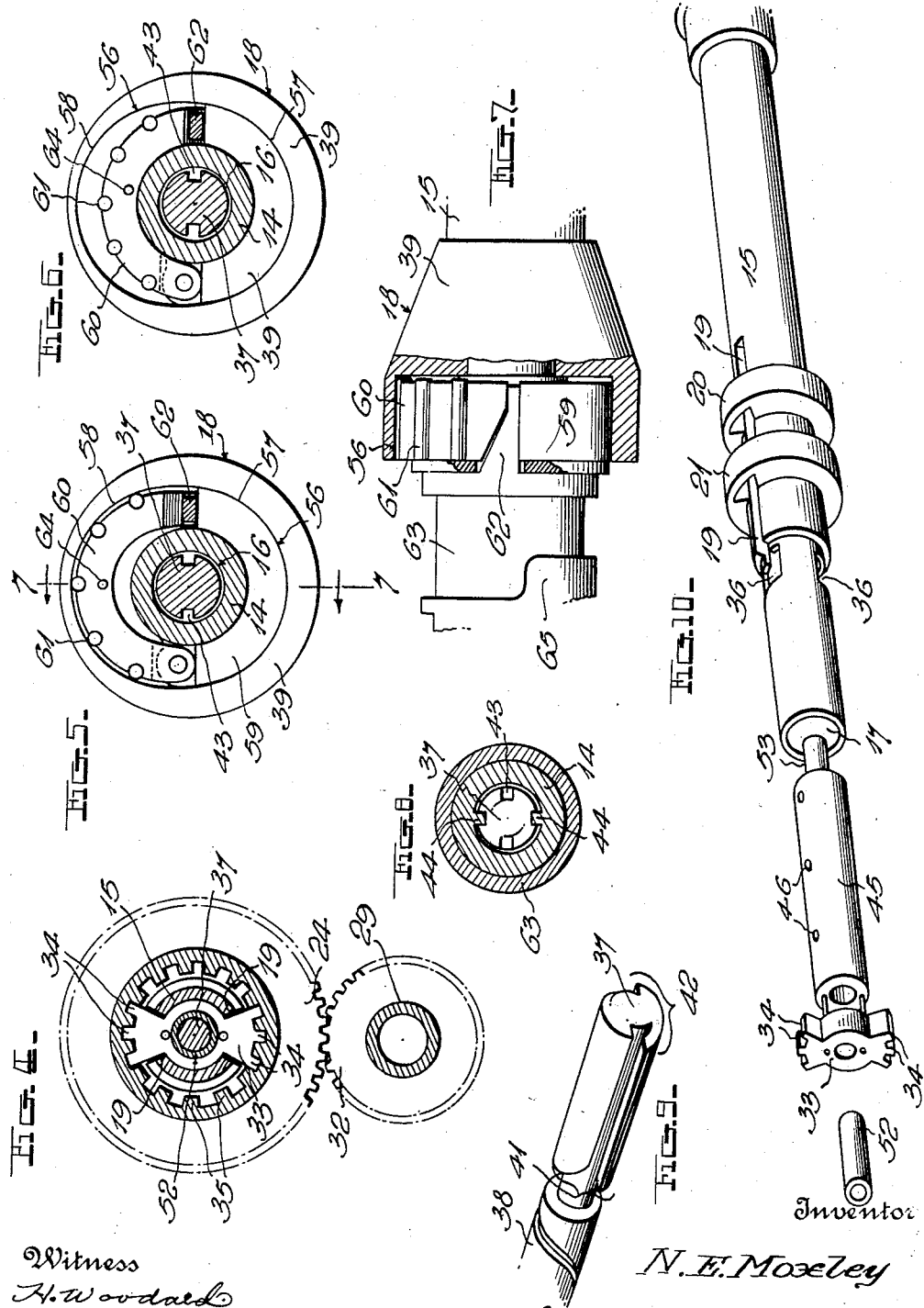

1,884,595

UNITED STATES PATENT OFFICE

NORMAN E. MOXLEY, OF ELLICOTT CITY, MARYLAND

AUTOMATIC VARIABLE SPEED TRANSMISSION

Application filed May 11, 1931. Serial No. 536,581.

The invention relates to transmission mechanism designed primarily for motor vehicles, and it aims to overcome the necessity of shifting gears by hand.

In attaining the above end, further aims are to provide unique means controlled by the foot accelerator or other motor speed controller for setting variable speed gearing to obtain the desired speed or pulling power; to provide a transmission which automatically shifts into low gear whenever the car is stopped and hence is in readiness for starting; to provide means active upon relative rotation of a drive shaft and a driven shaft for effecting speed changing and to provide a manually-controlled clutch which normally prevents relative rotation of said shafts but allows such rotation when desired; to provide for holding said clutch against throwing-out when the braking power of the motor is to be utilized; to provide for holding said clutch in thrown-out position as long as desired, to permit free-wheeling; to make novel provision for reversing; to provide a rather simple and inexpensive, yet an efficient, reliable and durable transmission which may be controlled with little effort, etc.

With the foregoing in view, the invention resides in the novel subject matter hereinafter described and claimed, description being accomplished by reference to the accompanying drawings.

Fig. 1 is a longitudinal sectional view showing the transmission set in low gear.

Fig. 2 is a view similar to Fig. 1 but showing the transmission set for direct drive.

Fig. 3 is a longitudinal sectional view showing the relation of elements immediately prior to shifting from direct drive into second gear.

Fig. 4 is a transverse sectional view on line 4—4 of Fig. 2, showing the speed changer or driving member which is slidable along the driven shaft into engagement with any of a plurality of gears.

Fig. 5 is a transverse sectional view on line 5—5 of Fig. 2 showing the clutch in its operative position for positively holding the drive shaft and driven shaft against relative rotation.

Fig. 6 is a view similar to Fig. 5 but cut on line 6—6 of Fig. 3 and showing the clutch thrown-out.

Fig. 7 is a side elevation partly in section on line 7—7 of Fig. 5, showing more particularly the clutch structure.

Fig. 8 is a detail transverse sectional view on line 8—8 of Fig. 2 illustrating part of the connecting means between the drive shaft and the rod which shifts the above-mentioned speed changer or driving member.

Fig. 9 is a perspective view of one end of the above-mentioned rod showing the ratchet formations thereon which co-act with the inwardly projecting lugs seen in Figs. 1, 2, 3 and 8.

Fig. 10 is a disassembled perspective view showing a number of parts hereinafter described.

Fig. 11 is a detail perspective view of the clutch throw-out collar and cam.

In the drawings above briefly described, a preferred construction has been illustrated, and while this construction will be herein specifically explained, it is to be understood that within the scope of the invention as claimed, numerous variations may be made.

An elongated housing 12 is provided, extending rearwardly from the conventional clutch housing 13 of an automobile motor, and a drive shaft which is driven by said motor through the instrumentality of the conventional clutch, extends rearwardly into said housing 12, said drive shaft being denoted at 14. Rotatably mounted in housing 12 in axial alinement with the drive shaft 14, is a driven shaft 15, said shafts 14 and 15 having registering longitudinal bores 16 and 17 respectively. A clutch 18 is provided to normally hold the two shafts 14 and 15 against relative rotation but for allowing such relative rotation when desired, and provision is made whereby the transmission is automatically shifted into low gear whenever the drive shaft 14 overruns the driven shaft 15, and for shifting said transmission into direct drive or "high" whenever said driven shaft 15 over-runs said drive shaft 14. It is hence important that whenever the transmission is set for one speed or another, there shall be no slippage of the clutch 18, and the structure of this clutch which will be hereinafter explained, will positively prevent such slippage.

The rear end of the drive shaft 15 is provided with opposed longitudinal slots 19 and this slotted portion of said shaft, is provided with two longitudinally spaced bushings or collars 20 and 21 which may be pressed onto said shaft or otherwise secured thereto. In front of the bushing 20, a gear 22 is rotatable upon the shaft 15, a larger gear 23 is rotatable upon the bushing 20, and a still larger gear 24 is rotatable upon the bushing 21, said gear 24 being rigid with the front end of a propeller shaft section 25 which is rotatably mounted in the rear portion of the housing 12 and is suitably coupled to the major portion 26 of the propeller shaft which extends on to the usual rear end of the machine, universal joints being of course used where required. The rear portion of the driven shaft 15 is rotatable within the propeller shaft section 25 but may be free of contact with it, for the rear bearing for said shaft 15 is afforded by the bushing 21 within the gear 24 of said section 25, the latter being supported by appropriate bearing means 27. Suitable bearing means 28 is employed for the front portion of the shaft 15, said bearing means embodying appropriate provision in practice, to hold the shaft against end play.

Parallel with the shafts 15 and 14 and suitably mounted in the housing 12 is a counter-shaft 29 carrying three gears 30, 31 and 32, all secured to said shaft. Gear 30 is relatively large and meshes constantly with gear 22, gear 31 is somewhat smaller and meshes constantly with gear 23, and gear 32 is still smaller and is in constant mesh with gear 24. Hence, it will be seen that when gear 22 is driven by the shaft 15, the parts 30, 29, 32 and 24 will drive the propeller shaft 25—26 at low speed; that when gear 23 is driven by shaft 15, the parts 31, 29, 32 and 24 will drive said propeller shaft at a greater speed (second gear), and that when the shaft 15 is directly connected with the gear 24, said shaft 15 will directly drive the propeller shaft 25—26, the transmission being then in "high gear." Provision is made for operatively connecting the shaft 15 with any of the gears 22, 23 and 24, and provision is also made for retrogradely rotating the counter-shaft 29 when the car is to be reversed.

A driving member or speed changer 33 passes slidably through the slots 19 of the driven shaft 15 and is provided with teeth 34 engageable with internal teeth 35 on the three gears 22, 23 and 24. The enlarged portions 36 of the slots 19 allows insertion of the speed changer 33 transversely of the shaft 15, to its operative position, when initially assembling the mechanism.

When the speed changer 33 engages the gear 22, the transmission is "in low"; when said speed changer engages gear 23, the transmission is in "second gear" and when said speed changer engages the gear 24, the mechanism is in "high" or direct drive. Provision is made, brought into play by relative rotation of the two shafts 14 and 15, for shifting the speed changer 33 toward "low gear" whenever shaft 14 is allowed to over-run shaft 15, and for shifting said speed changer 33 toward "high gear" whenever shaft 15 over-runs shaft 14, and hence the clutch 18 which either prevents or allows relative rotation of the two shafts 14 and 15, controls the movement of the speed changer 33 to its different positions.

In providing for shifting of the speed changer 33, I employ a rod 37 jointly received in the two bores 16 and 17 of the shafts 14 and 15 respectively, the rear end of said rod 37 being operatively connected with the speed changer 33 in a manner hereinafter described. A worm connection 38 is provided between the rod 37 and the driven shaft 15 to effect longitudinal movement of said rod whenever the latter and the shaft 15 rotate relatively. In the present showing, the head 39 of the clutch 18 is rigidly secured upon the shaft 15 and the worm 38 engages a helical rib 40 within said head. Co-acting means are provided in the bore 16 of the shaft 14 and on the front end of the rod 37, to operatively connect said rod 37 with said shaft 14 when relative rotation of the two shafts 14 and 15 is permitted. Hence, relative rotation of rod 37 and shaft 15 is effected in one direction or the other, causing the worm connection 38 to longitudinally move said rod for the purpose of shifting the speed changer 33 in one direction or the other. If shaft 14 be rotated faster than shaft 15, speed changer 33 will be shifted toward "low gear," whereas if shaft 15 be rotating faster than shaft 14, said speed changer 33 will be shifted toward "high."

The front end portion of the rod 37 is provided with two ratchet formations 41 and 42 spaced apart longitudinally of said rod, said ratchet formations facing circumferentially in opposite directions and facing longitudinally of the rod in opposite directions. Longitudinal grooves 43 are formed in the rod 37, leading from the ratchet formation 41 to the ratchet formation 42. Two lugs 44 are suitably secured in the bore 16 of the drive shaft 14 for co-action either with the ratchet formation 41 or with the formation 42. When the transmission is in "high" (Fig. 2), the lugs 44 are disposed at the ratchet formation 42 in readiness to coact with the latter to effect rotation of the rod 37 to shift the speed changer toward "low gear" whenever shaft 14 over-runs shaft 15, and as soon as said lugs have engaged said ratchet formation 42 and started to rotate the rod 37 within the shaft 15, said rod 37 is moved forwardly by the worm connection 38, the lugs 44 being then received in the grooves or guideways 43. When the member 33 reaches low speed position (Fig. 1), the ratchet formation 41 has arrived at the lugs 44 as seen in this view. Hence, the ratchet formation 41 and the lugs 44 are in readiness to effect rotation of the rod 37 in the reverse direction to shift the speed changer 33 again toward "high" whenever shaft 15 is allowed to over-run the shaft 14. The lugs 44 are held yieldably against the ratchet formation 42 in readiness to operatively engage the latter, when the parts stand as in Fig. 2 and are similarly held yieldably against the ratchet formation 41 when said parts stand as seen in Fig. 1. This is due to the provision of spring means operatively connecting the rod 37 with the speed changer 33, said spring means being stressed in one direction when the ratchet formation 41 disengages from the lugs 44 and effects the final forward movement of the rod 37, and being stressed in the opposite direction when the ratchet formation 42 clears said lugs 44 and effects the final rearward movement of said rod 37. This stressing of the spring means insures that while the lugs 44 may click idly over either of the ratchet connections 41 and 42 when relative rotation in one direction occurs, they shall engage when relative rotation in the other direction takes place. The spring means in question can be more fully described after first explaining other details.

A sleeve 45 surrounds the rear portion of the rod 37 and is slidable within the bore 17 of the driven shaft 15, said sleeve abutting the front side of the speed changer 33 and having peripheral sockets 46 cooperable with spring-pressed detents 47 to hold said sleeve in any of the three positions to which it may shift with said speed changer 33. The rod 37 extends rearwardly beyond the speed changer 33 and is provided with a shoulder 48. This rod is also provided with a shoulder 49 in advance of the sleeve 45. One coil spring 50 is interposed between the shoulder 48 and the speed changer 33 and another coil spring 51 is interposed between the front end of the sleeve 45 and the shoulder 49. Hence, the rod 37 may remove either forwardly or rearwardly with respect to the speed changer 33 and the sleeve 45, before actually moving said parts 33 and 45, rearward movement of the rod 37 serving to compress the spring 51 and free the spring 50 of compression, while forward movement of said rod 37 compresses spring 50 and frees spring 51 of compression.

A thrust sleeve 52 surrounds the rod 37 within the spring 50 and a similar thrust sleeve 53 surrounds said rod within the spring 51. When spring 50 has been compressed to a predetermined extent, shoulder 48 strikes sleeve 52 and forces forwardly upon the speed changer 33 and the sleeve 45, causing the detents 47 to disengage from the recesses 46 and allowing the parts 33 and 45 to shift under the action of the compressed spring 50. When rod 37 has moved rearwardly to compress spring 51 and the shoulder 49 thrusts against the sleeve 53, this sleeve rearwardly forces against the sleeve 45 and the speed changer 33, disengaging the detents 47 and allowing said parts 45 and 33 to rearwardly shift under the action of the compressed spring 51.

When the speed changer 33 arrives at its foremost or "low speed" position (Fig. 1), the ratchet formation 41 disengages from the lugs 44 and such disengagement effects a slight final forward movement of the rod 37, thereby compressing the spring 50 to a slight extent, such extent however being sufficient to exert a slight rearward thrust on said rod 37, to cause engagement of the ratchet formation 41 with the lugs 44, whenever said parts 41 and 44 turn relatively in the proper direction, incident to relative rotation of the shafts 14 and 15. Similarly, as the speed changer 33 reaches its "high speed" position (Fig. 2), the ratchet formation 42 clears the lugs 44, and as said formation 42 disengages from said lugs, it imparts a slight rearward movement to the rod 37, thereby slightly compressing the spring 51. Consequently, this spring exerts a forward thrust on the rod 37, holding the ratchet formation 42 in readiness to engage the lugs 44 upon proper relative rotation of parts. No such relative rotation, it will be recalled, can take place until the operator throws out the clutch 18, and hence, by controlling this clutch, the driver of the machine controls the setting of the variable speed transmission mechanism, for different speeds. The clutch 18, in the present showing, is so related with a foot accelerator or other speed controller 55 for the driving motor of the shaft 14, that the clutch will be automatically thrown out when said speed controller moves to or slightly beyond minimum-speed position, and the arrangement of parts is such that when said speed controller 55 is again moved in motor-speed-increasing direction, the clutch 18 is again thrown in. Hence, as the clutch 18 controls setting of the variable speed transmission for different speeds, and the motor-speed controller 15 controls said clutch, it will be seen that setting of the transmission mechanism for one speed or another, may be attained simply by properly operating the speed controller or accelerator 55. The manner in which this end is attained, can of course be better understood after a detailed explanation of the mechanism whereby the movements of the accelerator or the like 55, control the clutch 18, and before giving such explanation, it will be well to explain the clutch structure, even though any appropriate clutch for positively holding the shafts 14 and 15 normally against relative rotation, could be employed.

The clutch head 39 is provided in its front end with a continuous-walled socket 56, half of the circumference of said socket being concentric with the shafts 14 and 15, while the other half of said circumference is eccentric to said shafts, said concentric and eccentric circumference halves being denoted at 57 and 58 respectively in Figs. 4 and 5. The shaft 14 extends rearwardly into and is rotatably engaged with the head 39, said shaft 14 being provided with one fixed clutch shoe 59 and with a pivoted clutch shoe 60, said shoes 59 and 60 being adapted to engage the halves 57 and 58 of the socket side wall above described, when the clutch is thrown in as seen for instance in Figs. 1, 2 and 5, the two shafts 14 and 15 being hence locked against any relative rotation. When the shoe 60 however is allowed to swing inwardly to the position shown in Fig. 6, it is concentric with the shafts 14 and 15 and hence these shafts may relatively rotate. This shoe 60 is by preference provided with peripheral rollers 61 to travel upon the side wall of the socket 56 whenever relative rotation of the two shafts 14 and 15 is taking place.

A wedge 62 (Figs. 5, 6 and 7) is provided to either normally hold the shoe 60 in the position of Fig. 5 or to allow said shoe to swing inwardly. This wedge is carried by a clutch collar 63 and when said collar is in its rearmost position as in Figs. 1 and 2, the clutch 18 is thrown in, the shoe 60 then standing as in Fig. 5. When the collar 63 is moved forwardly to the position shown in Fig. 3, the wedge 62 frees the shoe 60, allowing it to swing inwardly to the position shown in Figs. 3 and 6, thereby throwing the clutch out. A ball detent or the like 64 may be employed to yieldably hold the shoe in its inwardly swung position.

The collar 63 is provided with a clutch throw-out cam 65 co-operable with an abutment pin 66 which is slidable through the top of the housing 12, said pin being normally held in the raised position of Figs. 1 and 2 by a coil spring 67. When the pin 66 is projected inwardly into the path of the cam 65 however, said pin and cam co-act to slide the clutch collar 63 forwardly against spring S as seen in Fig. 3, thereby throwing the clutch 18 out. A slide rod 68 is suitably connected with the collar 63 and extends forwardly therefrom, said rod having a shoulder 69 for co-action with a latch pin 70 which is slidable through the top of the housing 12 in advance of the abutment pin 66, said latch pin 70 being urged constantly upward by a coil spring 71. A lever 72 is fulcrumed at 73 upon the top of the housing 12, the fulcrum being between the pins 66 and 70. This lever rests upon both of these pins and is pivoted at 74 to the speed controller or accelerator 55, and the latter is preferably slidably connected at 75 with a push rod 76 extending to the carburetor throttle valve or to some equivalent controlling means for the speed of the motor. Whenever the speed controller 55 is depressed, lever 72 is rocked downwardly to or beyond the position shown in Fig. 1, thereby holding the latch pin 70 released from the rod 68 and holding the abutment pin 66 raised out of the path of the cam 65. When the speed controller or the like 55 rises to or slightly beyond minimum-speed position, the lever 72 depresses the abutment pin 66 into the path of the cam 65 and frees the latch pin 70, as shown in Fig. 3. Hence, the cam 65 and the abutment pin 66 then co-act in forwardly sliding the collar 63 to throw out the clutch 18, and the latch pin 70 engages the shoulder 69 of the slide rod 68 to hold said collar 63 against return to clutch-in position, until the speed controller 55 is again depressed and the lever 72 consequently rocked to release said latch pin and raise the abutment pin 66. The interval between "letting up on the gas" (allowing the speed controller 55 to ascend) and again feeding gas to the motor (depressing the speed controller 55) will be utilized for either shifting gears or for free-wheeling, according to the position at which the speed controller 33 is set when the clutch 18 is thrown-out, and according to the relative rotation which takes place between the shafts 14 and 15 while said clutch is free, as will hereinafter more fully appear.

Should it be desired to prevent the clutch 18 from being thrown out when "letting up on the gas," this may be accomplished by so setting a stop 77 as to prevent sufficient movement of the lever 72 to depress the abutment pin 66. A rod 78 is shown connected with the stop 77 and may be considered as part of operating means for either normally holding said stop released or for shifting it to the operative dotted line position shown in Fig. 2. When this stop is in the position just mentioned, drive will be maintained from the wheels to the car to the motor, allowing the latter to act as a brake.

Provision is made for retrogradely rotating the shaft 29 to reverse the machine. A gear 79 is shown secured upon the shaft 29, said gear meshing constantly with an idle gear 80 which is spaced forwardly from the clutch collar 63. This collar is provided with a gear 81 and said collar is splined at 82 upon the shaft 14. When the collar 63 is pulled forwardly sufficiently to mesh the gear 81 with the gear 80, reverse drive will take place, and for so moving said collar, a hand lever 83 is shown having a suitable connection 84 with the slide rod 68, appropriate means 85 being provided for holding said lever in one position or another.

To describe the general operation of the invention, it will be assumed that the car is standing still with the motor idling and that the speed changer 33 stands in the low speed position shown in Fig. 1. Under such circumstances, the accelerator or the like 55, lever 72, abutment pin 66, clutch collar 63, slide rod 68 and latch pin 70 stand as shown in Fig. 3. The operator wishes to start and in order to do so, he is only required to depress the accelerator or speed controller 55. This increases the speed of the driving motor of the shaft 14 and so rocks lever 72 that latch pin 70 releases the slide rod 68, abutment pin 66 moves out of the path of cam 65, and clutch spring S rearwardly slides collar 63, causing the wedge 62 to outwardly force the shoe 60, thereby throwing the clutch 18 in and establishing a positive driving connection between shaft 14 and shaft 15. Shaft 15 through the instrumentality of the driving member or speed changer 33, drives the gear 22, this gear in turn drives gear 32 and consequently shaft 29 is driven. This shaft 29 drives the propeller shaft 25—26 through the instrumentality of the gears 32 and 24 and consequently the machine progresses in low gear. When sufficient speed has been attained, the operator wishes to shift into second gear. To accomplish this, he merely "lets up" on the accelerator or the like 55 and then promptly again depresses said accelerator or the like. When this member 55 is allowed to ascend, lever 72 depresses the abutment pin 66 into the path of the clutch throw-out cam 65 of the collar 63, so that said collar moves forwardly to the position seen in Fig. 3, throwing out the clutch 18. Ascent of the member 55 of course decreases the motor speed and hence as soon as clutch 18 is thrown out, the driven shaft 15 over-runs the drive shaft 14. As soon as such over-running starts, the ratchet formation 41 (see Fig. 1 again) engages the lugs 44 and hence connects the rod 37 with the drive shaft 14, so that as the shaft 15 continues to over-run said drive shaft, the worm connection 38 will rearwardly push the rod 37, the lugs 44 being then received in the grooves 43. Such rearward movement of the rod 37, first compresses the spring 51 and then causes the shoulder 49 to push against the thrust sleeve 53, in turn so pushing the sleeve 45 and the speed changer 33 as to disengage the detents 47 from the recesses 46. As soon as such disengagement take place, the compressed spring 51 rapidly shifts the sleeve 45 and the speed changer 33 rearwardly until the latter engages the gear 23, and the detents 47 then snap into the next recesses 46. If by this time, the operator has again depressed the accelerator or the like 55, the clutch collar 63 will be rearwardly returned by the spring S to again throw-in the clutch 18, with the result that the drive shaft 14 then drives the driven shaft 15, the speed changer 33 drives the gear 23, and through the instrumentality of the parts 31, 29, 32 and 24, said gear 23 then drives the propeller shaft 25—26. The car is now in second gear and when desired speed is attained, the operator again allows the speed controller or accelerator 55 to ascend and then again depresses it. Such operations will of course find the lugs 44 between the ends of the grooves 43 with the result that as soon as the clutch 18 is thrown-out, such relative rotation of the rod 37 and the shaft 15 will take place as to further force said rod rearwardly, again compressing spring 51 and effecting shifting of the speed changer 33 to high speed position (Fig. 2), in the same manner as movement of said speed changer 33 was effected from low speed to second. After this speed changer reaches its high speed position, depression of the accelerator or the like 55 increases the motor speed and whenever it is desired to use the motor as a brake, the stop 77 is thrown to the dotted line position of Fig. 2 before "letting up on the gas". If this stop is not moved to its effective position, however, whenever the operator allows the accelerator or the like 55 to ascend, lever 72 depresses the abutment pin 66, the cam 65 co-acts with said abutment pin in throwing-out the clutch 18, and the latch pin 70 co-acts with the slide rod 68 in holding the clutch in thrown-out position, thereby allowing free-wheeling. While such free-wheeling is taking place, the shaft 15 of course overruns the drive shaft 14, but the relative movement taking place between said shafts is such as to merely cause the ratchet formation 42 to click idly over the lugs 44 so that no gear shifting takes place (see Fig. 2). When it is no longer desired to coast or free-wheel, the driver again depresses the accelerator or the like 55, in so doing, he effects release of the latch pin 70 through the instrumentality of the lever 72, abutment pin 66 again rises, and clutch spring S comes into play to again throw the clutch 18 in, so that continued driving in high gear may be carried out. If it be required to shift from "high" into "second", the driver merely "lets up on the gas" for an instant and then again depresses the accelerator or the like. To understand this operation, reference may be had to Figs. 2 and 3. As soon as 55 ascends, clutch 18 is thrown out as above described and held in thrown-out condition, but due to the resistance to forward travel which has necessitated "dropping into second", the drive shaft 14 over-runs the driven shaft 15 as soon as clutch 18 is free, the result being that the lugs 44 and the ratchet formation 42 come into play to connect the rod 37 with the shaft 14, causing such relative movement between said rod 37 and the shaft 15, as to cause the worm connection 38 to forwardly slide said rod. Such forward sliding compresses the spring 50 as seen in Fig. 3 and when shoulder 48 abuts sleeve 52, the detents 47 are disengaged, whereupon the compressed spring 50 comes into play to quickly shift the speed changer 33 from the position of Fig. 2 to that position at which it will engage the gear 23. If by the time the speed changer 33 has engaged the gear 23, the operator again feeds the gas to the motor, the machine will progress in second gear, but if he delays such gas-feeding sufficiently long, said speed changer will be further shifted by its operating means until it is in the low speed position shown in Fig. 1. In "dropping from second to low", the operations performed are about the same as in "dropping from high to second".

The machine may be stopped at any time simply by releasing the accelerator or the like 55 and applying the conventional brake. As soon as member 55 ascends, parts above described effect throwing-out of the clutch 18 as previously explained, and after the car has been brought to a standstill, with the motor idling, the shaft 14 of course overruns the shaft 15. This automatically effects shifting of the speed changer 33 to the low gear position of Fig. 1, in readiness to again drive the machine forwardly.

Whenever it is desired to reverse, the conventional clutch is thrown out, and lever 83 is operated to cause the slide rod 68 to so move the clutch collar 63 as to engage gear 81 with gear 80. Then, when the clutch is again let in, shaft 29 will be reversely driven and the gears 32 and 24 will reversely drive the propeller shaft 25—26. Lever 83 may also be used to hold the entire transmission out of gear if desired.

As excellent results may be obtained from the general structure shown and described, it is preferably followed. Attention however is again invited to the fact that within the scope of the invention as claimed, variations may be made.

I claim:—

1. In an automobile driving means, a variable speed transmission, automatic shifting means for said transmission, a driving motor for said transmission, a manually actuated accelerator for said motor, and means under the control of said accelerator for causing said automatic shifting mechanism to function.

2. In a variable speed transmission, a motor-driven shaft, variable speed transmission means driven by said shaft, mechanical means for setting said transmission means for different speeds, said setting means having controlling means for bringing it into play, a manually-actuated speed controller for the driving motor of said shaft, and actuating means for said controlling means operatively connected with and actuated by said speed controller.

3. In a variable speed transmission, a motor-driven drive shaft, a driven shaft, a clutch for normally holding the two shafts against relative rotation, variable speed gearing for transmitting power from said driven shaft, means actuated by relative rotation of said shafts for setting said gearing to obtain different speeds, a manually-actuated speed controller for the driving motor of said drive shaft, and throw-out means for said clutch operatively connected with said speed controller for throwing said clutch out upon movement of said speed controller to minimum-speed position.

4. In a variable speed transmission, a motor-driven drive shaft, a driven shaft, a clutch for normally holding the two shafts against relative rotation, variable speed gearing for transmitting power from said driven shaft, means actuated by relative rotation of said shafts for setting said gearing to obtain different speeds, a manually-actuated speed controller for the driving motor of said drive shaft, throw-out means for said clutch operatively connected with said speed controller for throwing said clutch out upon movement of said speed controller to minimum-speed position, latch means for holding said clutch in thrown out position, and means for releasing said latch means when said speed controller is moved again in speed increasing direction.

5. In a variable speed transmission, a motor-driven drive shaft, a driven shaft, a clutch for normally holding the two shafts against relative rotation, variable speed gearing for transmitting power from said driven shaft, means actuated by relative rotation of said shafts for setting said gearing to obtain different speeds, a manually-actuated speed controller for the driving motor of said drive shaft, throw-out means for said clutch operatively connected with said speed controller for throwing said clutch out upon movement of said speed controller to minimum-speed position, and manually set means for holding said throw-out means against functioning if desired.

6. In a variable speed transmission, a motor-driven drive shaft, a driven shaft, a clutch for normally holding the two shafts against relative rotation, variable speed gearing for transmitting power from said driven shaft, means actuated by relative rotation of said shafts for setting said gearing to obtain different speeds, a manually-actuated speed controller for the driving motor of said drive shaft, throw-out means for said clutch operatively connected with said speed controller for throwing said clutch out upon movement of said speed controller to minimum-speed position, and means for holding said clutch thrown out for any desired period of time.

7. In a reversible automatic transmission including a clutch for controlling gear shifting, a collar for operating said clutch, said collar being movable from a clutch-in position to a clutch-out position and further in the same direction to a transmission reversing position, automatic means under manual control for moving said collar to said clutch-out position, and additional manually actuated means for shifting said collar to said reversing position.

8. In a transmission, a housing, a drive shaft extending into said housing, a clutch collar slidable on and rotatable with said shaft, a gear carried rigidly by said collar, a clutch controlled by said collar, transmission mechanism driven by said clutch, a reverse-drive shaft for said transmission mechanism, gearing for driving said reverse-drive shaft embodying a normally idle gear spaced from said collar-carried gear in the direction in which said collar moves to throw out the clutch, automatic means under manual control for shifting said collar to clutch-out position, and additional manually actuated means for further shifting said collar to mesh its gears with said normally idle gear.

9. In a transmission, a housing, a drive shaft extending into said housing, a clutch-controlling collar slidable on and rotatable with said shaft, said collar having a clutch throw-out cam, an abutment pin slidable through the housing top for co-action with said cam, a slide rod connected with and extending forwardly from said collar, a latch pin slidable through said housing top in advance of said abutment pin for holding said slide rod in clutch-out position, and a manually-actuated lever over the housing operatively connected with both of said pins and fulcrumed to the housing between said pins, whereby one movement of said lever will project said abutment pin to operative position and effect application of said latch pin, and vice versa.

10. In a variable speed transmission, a shaft, a driven shaft, a clutch for positively holding said shafts against relative rotation until desired, variable speed gearing for transmitting power from said driven shaft, said gearing having a speed changer shiftable to different positions, and automatic operating means for said speed changer operatively connected with the latter, said operating means embodying means for automatically shifting said speed changer in one direction when said clutch is thrown out and the drive shaft is allowed to overrun the driven shaft, and means for automatically shifting said speed changer in the other direction when said clutch is thrown out and said driven shaft is allowed to over-run said drive shaft.

11. In a variable speed transmission, a drive shaft, a driven shaft, a clutch for positively holding said shafts against relative rotation until desired, variable speed gearing for transmitting power from said driven shaft, said gearing having a speed changer shiftable to different positions, shifting means for said speed changer operatively connected with the latter and carried by said driven shaft, and co-acting means on said drive shaft and said shifting means for actuating the latter when relative rotation of the two shafts is permitted.

12. In a variable speed transmission, a drive shaft, a driven shaft, said shafts having registering longitudinal bores, a clutch for positively holding said shafts against relative rotation until desired, variable speed gearing for transmitting power from said driven shaft, said gearing having a speed changer shiftable to different positions, shifting means for said speed changer operatively connected with the latter and confined within said bores, and means within the bore of said drive shaft actuated by relative rotation of the two shafts for actuating said shifting means.

13. In a variable speed transmission, a drive shaft, a driven shaft, a clutch for positively holding said shafts against relative rotation until desired, variable speed gearing for transmitting power from said driven shaft, said gearing having a speed changer shiftable to different positions, a rod extending longitudinally of said shafts and having a worm connection with the driven shaft, means operatively connecting said rod with said speed changer to shift the latter to its different positions upon longitudinal movement of the rod, and co-acting means on said rod and said drive shaft for effecting relative rotation of said rod and said driven shaft upon relative rotation of the two shafts, whereby said worm connection will then longitudinally move said rod to shift said speed changer.

14. In a variable speed transmission, a drive shaft, a driven shaft, a clutch for positively holding said shafts against relative rotation until desired, variable speed gearing for transmitting power from said driven shaft, said gearing having a speed changer shiftable to different positions, a rod extending longitudinally of said shafts and operatively connected with said speed changer for shifting the latter to its different positions, said rod having a worm connection with said driven shaft to effect longitudinal movement of said rod upon rotation of the latter with respect to said driven shaft, and means for so rotating said rod, embodying means for rotating said rod in one direction when the drive shaft is allowed to overrun the driven shaft, and means for rotating said rod in the other direction when said driven shaft is allowed to over-run said drive shaft.

15. In a variable speed transmission, a drive shaft and a driven shaft in axial alinement, a clutch for positively holding said shafts against relative rotation until desired, variable speed gearing for transmitting power from said driven shaft, said gearing having a speed changer shiftable to different positions, a rod extending longitudinally of and co-axial with said shafts, said rod being operatively connected with said speed changer and having a worm connection with said driven shaft for longitudinally moving said rod upon rotation thereof with respect to said driven shaft, co-operable normally disengaged rod-rotating elements carried by the rod and the drive shaft respectively, and means for effecting engagement of said elements with each other when relative rotation of the two shafts is permitted, said elements being adapted to relatively slide as the rod moves longitudinally under the influence of said worm connection.

16. In a variable speed transmission, a drive shaft and a driven shaft in axial alinement, a clutch for positively holding said shafts against relative rotation until desired, variable speed gearing for transmitting power from said driven shaft, said gearing having a speed changer shiftable to different positions, a rod extending longitudinally of and co-axial with said shafts, said rod being operatively connected with said speed changer and having a worm connection with said driven shaft for longitudinally moving said rod upon rotation thereof with respect to said driven shaft, a lug on the drive shaft adjacent said rod, said rod having a ratchet formation adapted to click idly over said lug when one shaft is permitted to over-run the other shaft, and adapted to engage said lug and rotate said rod when said other shaft over-runs said one shaft, said rod having a guide leading from said ratchet formation and adapted to receive said lug as the rod moves longitudinally under the influence of said worm connection.

17. In a variable speed transmission, a drive shaft and a driven shaft in axial alinement, a clutch for positively holding said shaft against relative rotation until desired, variable speed gearing for transmitting power from said driven shaft, said gearing having a speed changer shiftable to different positions, a rod extending longitudinally of and co-axial with said shafts, said rod being operatively connected with said speed changer and having a worm connection with said driven shaft for longitudinally moving said rod upon rotation thereof with respect to said driven shaft, a lug on the drive shaft adjacent said rod, said rod having two longitudinally spaced ratchet formations facing longitudinally in opposite directions and facing circumferentially in opposite directions and having a guideway from one of said ratchet formations to the other, said lug being normally disposed adjacent one of said formations and adapted to co-act therewith in initially rotating said rod upon predetermined relative rotation of the two shafts, causing said worm connection to longitudinally move the rod in one direction and hence disposing the other ratchet formation adjacent the lug; said other ratchet formation being similarly co-operable with said lug to effect reverse longitudinal movement of said rod, said lug being received in said guideway during longitudinal movement of said rod.

18. A structure as specified in claim 16; the connection between said rod and said speed changer being provided with a spring which exerts an endwise thrust on said rod to yieldably hold said ratchet formation against said lug.

19. A structure as specified in claim 17; the connection between said rod and said speed changer being provided with spring means capable of exerting an endwise thrust on said rod in either direction according to the direction in which said spring means is stressed; one of said ratchet formations when arriving at said lug being adapted to co-act therewith to slightly shift said rod and hence stress said spring means in one direction; the other ratchet formation when arriving at said lug being adapted to co-act therewith in slightly shifting said rod in the other direction, thereby stressing said spring means in the other direction.

20. In a variable speed transmission, a drive shaft and a driven shaft disposed in alinement and having registering bores, a clutch for positively holding said shafts against relative rotation until desired, variable speed gearing for transmitting power from said driven shaft, said gearing having a speed changer shiftable to different positions and self-applied yieldable means for holding it in said positions; a rod within said bores having a worm connection with said driven shaft, connecting means between said rod and said speed changer embodying spring means capable of exerting a slight end thrust on said rod in either direction when stressed after engagement of said self-applied means, said rod being provided within the drive shaft bore with two longitudinally spaced ratchet formations and with a guideway extending between the same, said ratchet formations facing longitudinally in opposite directions and facing circumferentially in opposite directions, and a lug secured in said drive shaft bore, said lug being normally adjacent one of said ratchet formations and being adapted to co-act therewith to initially rotate said rod in one direction upon predetermined relative rotation of the two aforesaid shafts, causing said worm connection to longitudinally move said rod in one direction until the other ratchet formation arrives at said lug; said other ratchet formation and said lug being similarly co-operable to effect reverse longitudinal movement of said rod; said lug being received in said guideway during longitudinal movement of said rod; the aforesaid end thrust of said spring means on said rod being adapted to hold either of said ratchet formations in readiness to engage said lug, said lug and said ratchet formations being co-operable to stress said spring means when either of said ratchet formations arrives at said lug.

21. In a variable speed transmission, a drive shaft and a driven shaft disposed in alinement, a clutch for positively holding said shafts against relative rotation until desired, a rod having a worm connection with said driven shaft operable to longitudinally move the rod upon rotation thereof with respect to said driven shaft, and means for connecting said rod with said drive shaft for effecting said rotation of said rod when relative rotation of the two shafts is permitted.

22. In a variable speed transmission, a drive shaft and a driven shaft disposed in alinement, a clutch for positively holding said shafts against relative rotation until desired, a rod having a worm connection with said driven shaft operable to longitudinally move the rod upon rotation thereof with respect to said driven shaft, and a lug on said drive shaft, said rod having a ratchet formation adapted to engage said lug to effect said rotation of said rod when relative rotation of the two shafts is permitted.

23. In a variable speed transmission, a drive shaft and a driven shaft disposed in alinement, a clutch for positively holding said shafts against relative rotation until desired, a rod having a worm connection with said driven shaft operable to longitudinally move the rod upon rotation thereof with respect to said driven shaft, and a lug on said drive shaft, said rod being provided with two longitudinally spaced ratchet formations which face longitudinally in opposite directions and face circumferentially in opposite directions, said rod having a guideway from one of said ratchet formations to the other; one of said ratchet formations being normally disposed adjacent said lug and being adapted upon predetermined relative rotation of said shafts to coact with said lug in effecting rotation of said rod to cause said worm connection to longitudinally move the rod in one direction, said lug and the other ratchet formation being similarly co-operable to effect reverse longitudinal movement of the rod, said guideway receiving said lug as said rod moves longitudinally.

24. In a variable speed transmission, a tubular shaft having a slot, gears rotatable upon said shaft and spanning said slot, a driving member extending through said slot and adapted to connect any gear with said shaft, a sleeve slidable within said shaft and connected with said driving member, said shaft and sleeve having co-acting means for yieldably holding the latter in any position to which it is slid, an operating rod passing slidably through said sleeve and having shoulders spaced from opposite ends thereof, and coiled compression springs interposed between said sleeve ends and said shoulders.

25. In a variable speed transmission, a tubular shaft having a slot, gears rotatable upon said shaft and spanning said slot, a driving member extending through said slot and adapted to connect any gear with said shaft, a sleeve slidable within said shaft and connected with said driving member, said shaft and sleeve having co-acting means for yieldably holding the latter in any position to which it is slid, an operating rod passing slidably through said sleeve, spring means yieldably connecting said rod with said sleeve and stressed by sliding of the rod through the sleeve, and thrust means for positively connecting said rod and sleeve upon predetermined relative sliding thereof.

26. In an automobile driving means, a variable speed transmission, automatic shifting means for said transmission having releasable means for preventing shifting until released, a driving motor for said transmission, a manually actuated accelerator for said motor, and means under the control of said accelerator for automatically releasing said shift preventing means upon motor-speed-decreasing-movement of said accelerator to cause said automatic shifting mechanism to function, and for again applying said shift preventing means upon motor-speed-increasing-movement of said accelerator.

27. In an automobile driving means, a variable speed transmission having low, second and high speed portions, a driving motor for said transmission, a manually actuated accelerator for said motor, and means for (1)—automatically breaking the drive through low and (2)—automatically shifting the transmission into second upon movement of said accelerator in motor-speed-decreasing direction; (3)—for automatically re-establishing the drive through second when said accelerator is again moved in motor-speed-increasing direction; (4)—for automatically breaking the drive through second and (5)—automatically shifting the transmission into high when the accelerator is again moved in motor-speed-decreasing direction; and for (6)—automatically re-establishing the drive through high when said accelerator is again moved in motor-speed-increasing direction.

28. In an automobile driving means, a variable speed transmission having low, second and high speed portions, a driving motor for said transmission, a manually actuated accelerator for said motor, and means for (1)—automatically breaking the drive through high and (2)—automatically shifting the transmission into second upon movement of said accelerator in motor-speed-decreasing direction; (3)—for automatically re-establishing the drive through second when said accelerator is again moved in motor-speed-increasing direction; (4)—for automatically breaking the drive through second and (5)—automatically shifting the transmission into low when the accelerator is again moved in motor-speed-decreasing direction; and (6)—for automatically re-establishing the drive through low when said accelerator is again moved in motor-speed-increasing direction.

29. In an automatic transmission of the type in which relative rotation of drive and driven shafts actuates a screw to effect gear shifting; a clutch normally connecting said shafts and positively holding them against relative rotation, and means for throwing out said clutch at will.

In testimony whereof I affix my signature.

NORMAN E. MOXLEY.